April 3, 1951     E. S. TASCHER ET AL     2,547,292
PACKAGE SELECTOR AND LOADER
Filed Aug. 28, 1946     2 Sheets-Sheet 1
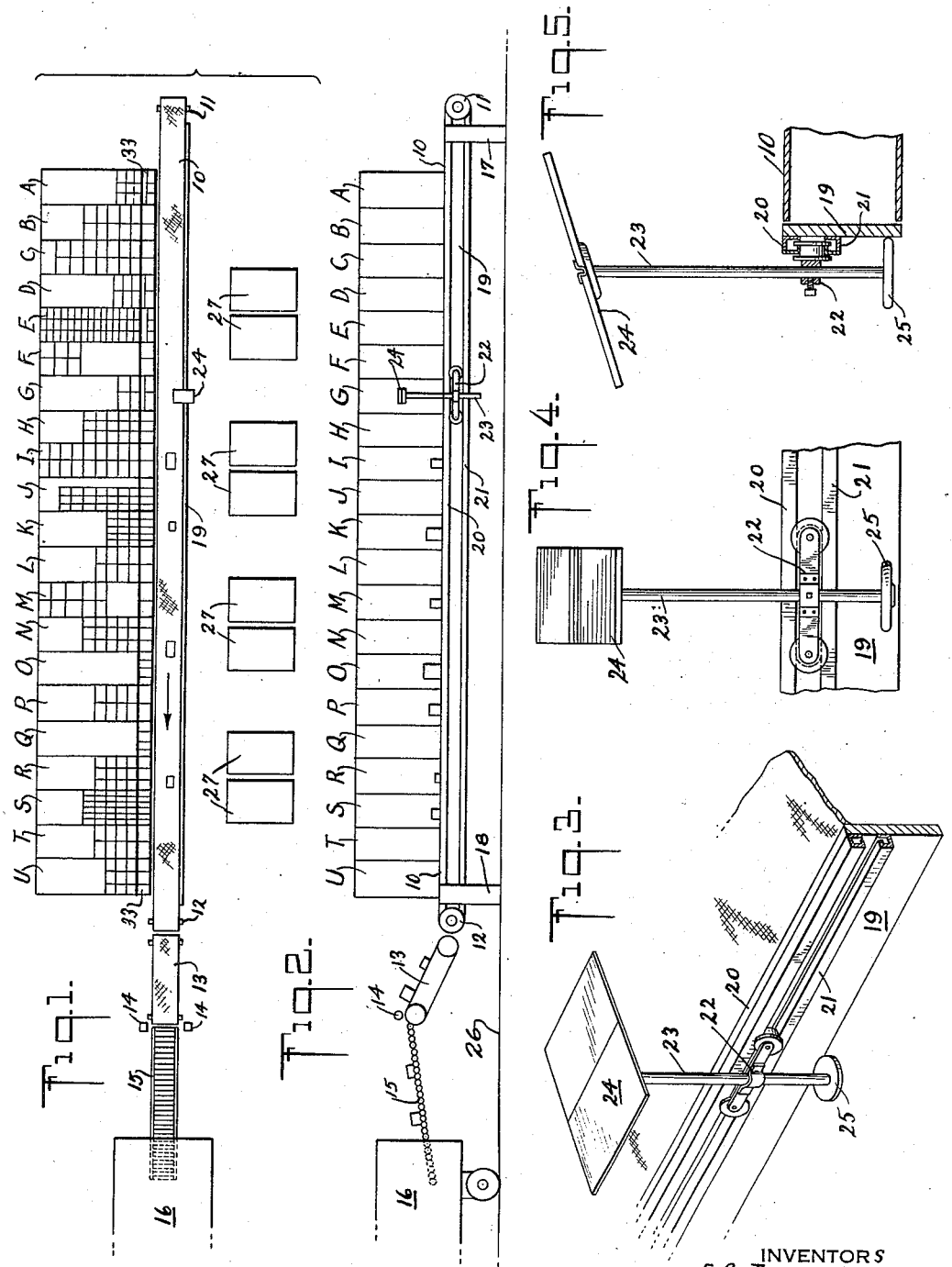
INVENTORS
E. S. TASCHER and
G. BRUNGARD
BY
Henry Savage
ATTORNEY

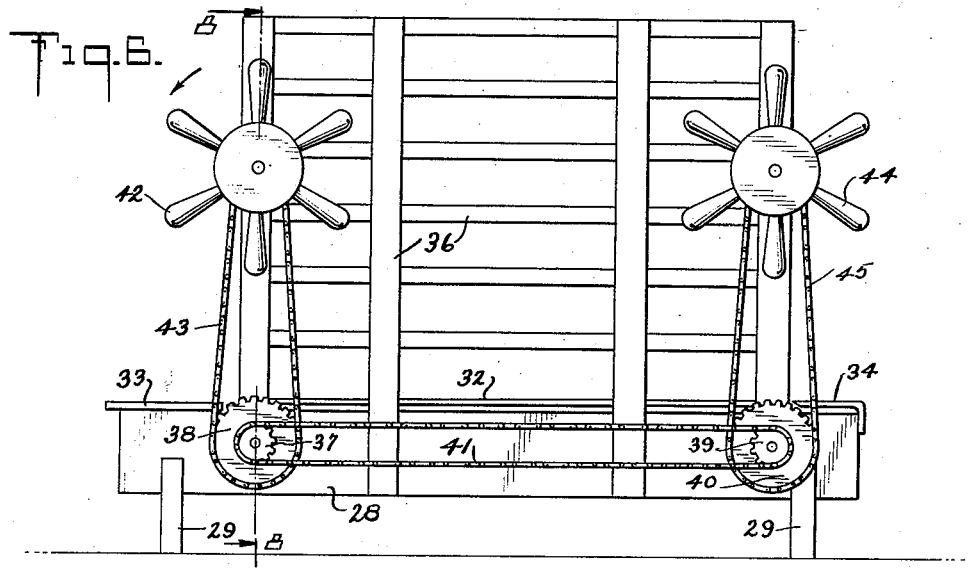
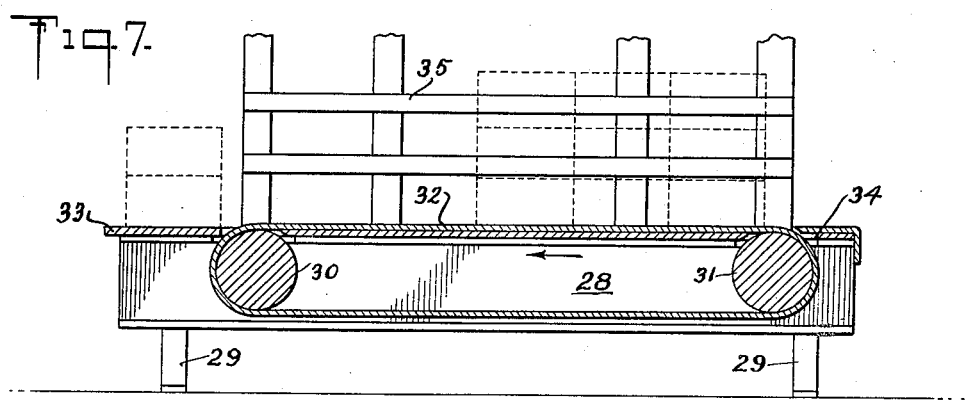
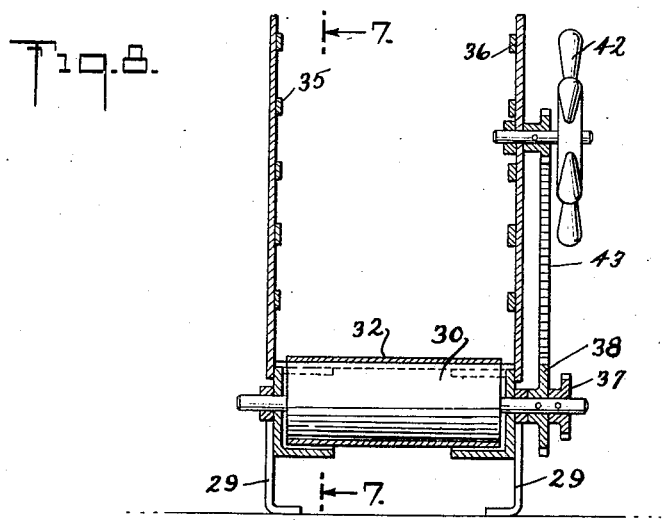

Patented Apr. 3, 1951

2,547,292

UNITED STATES PATENT OFFICE 2,547,292

PACKAGE SELECTOR AND LOADER

Eugene S. Tascher, Ingleside, and Guy Brungard, Upper Montclair, N. J., assignors to National Biscuit Company, New York, N. Y., a corporation of New Jersey Application August 28, 1946, Serial No. 693,440

9 Claims. (Cl. 186—1)

Our invention pertains to Package Selectors and Loaders and has for its principal object to facilitate, speed up, increase the accuracy and decrease the cost of selecting and loading specified items from a large variety of warehouse stock to motor trucks or other points of delivery.

Heretofore when filling orders for miscellaneous items from warehouse stock for delivery by truck or otherwise, it has been customary for a clerk to take one or more orders to the warehouse and then go from shelf to shelf or bin to bin where he selects the items that are grouped or assembled on a hand truck to fill the order or orders. This hand truck is then pushed to the delivery point where the items constituting the order are transferred to a motor truck for delivery to the dealer. This has not been entirely satisfactory, partly because of the labor involved, but principally because of its slowness and inaccuracy. The clerk, in his hurry or because of carelessness, often misses an item and duplicates others, which results in inaccuracy in filling orders and makes the warehouse records disagree with stock inventories. It is impossible to keep an accurate count on items delivered, or to make total items delivered agree with the total number of items called for by the day's orders.

An important object, therefore, of our invention is to decrease the labor involved in filling orders, to fill all orders accurately, to obtain an accurate count of all items delivered and to speed up the filling of orders. In a typical installation in a cracker and biscuit agency, the saving in labor averages 25% under labor costs previous to use of our invention.

Another important object is to provide a package selecting and loading system that is flexible in operation and can be speedily and easily altered or adjusted to different varieties of items, to different numbers of items and to different arrangements or order of selecting items.

Another object is to provide adjustable selective package bins in combination with a conveyor belt whereby a wide selection of items is always kept readily and conveniently within easy reach of an operator or order clerk.

Still another object is to provide means for accurately counting all items or packages selected to fill each order.

The above and other advantages and objects are attained by our invention, a preferred embodiment of which we have illustrated in the accompanying drawings.

Fig. 1 is a plan view, partly diagrammatic, showing a typical layout or installation of our invention.

Fig. 2 is a side elevation thereof.

Figs. 3, 4 and 5 are details of a trolley for holding the orders or order book.

Fig. 6 is a side elevation of a package bin that is adapted particularly for use in our invention.

Fig. 7 is a longitudinal section on line 7—7 of Fig. 8.

Fig. 8 is a section on line 8—8 of Fig. 6.

Referring first to Figs. 1 and 2, a conveyor 10 is supported and driven by pulleys 11, 12 and at one end delivers packages to a second conveyor 13, which is inclined upwardly away from conveyor 10 and is driven at a higher speed so that if packages are grouped together on conveyor 10 they will be separated on conveyor 13 so that they can be counted as they pass the electric eye 14 which controls a counter. From conveyor 13 the packages ride down a gravity conveyor 15 into a truck 16 or other delivery point.

The conveyor 10 is supported on standards 17, 18 which are connected by a side panel or guard 19 that supports a pair of rails 20, 21 on which trolley 22 runs.

This trolley has an adjustable standard 23 that supports a table 24 adapted to carry an order book or a number of order forms for merchandise to be placed upon the conveyor. The lower end of the standard 23 preferably has a roller 25 that runs on the side panel 19 to stabilize the trolley 22 and table 24.

On one side of conveyor 10 is a runway 26 which may be the warehouse floor along which the operator walks as he selects packages to place on the conveyor as called for by the order on the table 24, which he moves along with him on the trolley 22.

Adjacent the runway 26, at the back of the operator are a number of package trucks 27, each of which is filled with one of the items listed on the order blank. These trucks usually are portable floor trucks mounted on wheels and as one of them is emptied another one will be wheeled into position by the stock clerk or his assistant.

On the opposite side of the conveyor are a number of adjustable bins, A to U, each of which is filled with packages of one of the items included on the order blank. These adjustable bins are arranged with their delivery ends adjacent to the conveyor so that the packages on their front ends may be lifted off by the operator and placed on the conveyor 10 which will carry them to the truck 16 and each one will be counted as it passes the electric eye 14.

The packages in both the adjustable bins A to U and the floor trucks 27 are arranged in the same order as the printed items on the order blank. When the operator wishes to fill an order he places the order or his order book containing a number of orders on the table 24 of the carriage 22, then starting at the righthand end of the conveyor in Fig. 1 he moves along and picks up the packages from the bins A to U, or trucks 27, corresponding to the quantity called for by his order and places them on the conveyor 10. He thus proceeds down the line until all items on the order have been selected and placed on the conveyor, which carries them forward to the delivery truck where they are counted as they pass the electric eye 14.

The operator can easily reach into the open sides of the truck 27 to take off any packages contained therein and place them on the conveyor, but he can reach only the first row or two of packages on the adjustable bins A to U. In order that he may reach all of the packages in these adjustable bins from the farther side of the conveyor, we have made the bottom of these bins movable and placed the adjusting means within the reach of the operator so that he can advance the packages in these bins up to their forward ends where he can easily reach them and place them on the conveyor.

These adjustable bins have been particularly designed for and are an integral part of our package distributing and loading system. One of these bins is shown in detail in Figs. 6 to 8.

Each of these bins comprises a frame 28 mounted on standards 29 and at each end has a roller 30, 31 around which passes an endless apron 32, the upper face of which forms a movable floor for the bins. At the front or delivery end of the bins there is a take-off shelf 33, which provides a continuation of the floor 32 and at the rear end there is a loading ledge 34.

The bins are open at both ends, but the sides are closed in any suitable manner, as by lattice work 35, 36, or they may be made from sheet metal, fiber or plywood.

Each of the rollers 30, 31 is fixed to a shaft journalled in the frame 28 and each shaft carries two sprockets 37, 38 and 39, 40. A chain 41 passing around the sprockets 37, 39 causes the two rollers 30, 31 to rotate together to move the apron 32.

At the delivery end of the bins a hand-wheel 42 is mounted on one side of the bins so that it is within easy reach of the operator in the runway 26. This hand-wheel is connected to a sprocket which drives a chain 43 passing around the sprocket 38 so that when the operator turns the hand-wheel 42 the top run of the apron 32, which forms the floor of the bin, will be advanced carrying the packages forward until the first row rests on the take-off shelf 33.

On the opposite end of the bin there is a second similar hand-wheel 44, which through a chain 45 drives the sprocket 40 and may be operated by the stock clerk at the rear of the bins to load the bins as they become empty.

In operation the loading shelf 33 is level, or substantially level with the top run of the conveyor 10.

The bins A to U after being put in place adjacent the conveyor, as shown in Fig. 1, with their take-off shelves 33 near the edge of the conveyor, are filled by the stock clerk from the rear end. The clerk stacks the packages on the apron at the rear end adjacent the roller 31 and when he gets them stacked nearly to the top of the bins, he operates the hand-wheel 44 to advance the apron to carry them forward. He then places another tier of packages back of the first ones and again operates the hand-wheel to advance them. He continues to do this until the bins are filled with packages and the first row is forced out upon the take-off shelf 33. As the operator goes down the runway 26 he takes the packages from the shelf 33 and places them on the conveyor 10. When all the packages have been taken from the shelf 33 the operator will turn the hand-wheel 42 to bring the next tier or row of packages on to the shelf 33 where they will be within easy reach. He continues to do this from time to time as the packages are called for by his orders until the last tier of packages are brought up to the shelf 33. At or before this time, the stock clerk whose duty it is to keep track of the supply of packages in these bins, brings up a new supply to the rear end of the bins where he again fills them up, which he can do without disturbing the last tier of packages that are now resting on the shelf 33. If the bin contains more packages than the row on the take-off shelf when the stock clerk replenishes the supply, he will turn the hand-wheel 44 to move the apron 32 backward carrying all the packages toward the ledge 34 except for those on the shelf 33 which remain within reach of the operator. The clerk then refills the bin from the rear, advancing the packages with each additional tier until the front tier reaches the take-off shelf.

The bins, shown in Figs. 6 to 8, are capable of many modifications and variations and while we have shown the two hand-wheels 42, 44 on the same side of the bins, we have found it convenient in some cases to place the hand-wheel 44 and its cooperating sprocket 40 on the side of the bins opposite that on which the hand-wheel 42 is mounted.

We have not shown the means for driving the conveyors 10 and 13, but usually they will be driven from an electric motor through an adjustable drive by means of which their actual speeds as well as their relative speeds may be adjusted. We have shown twenty-one bins, marked A to U and eight trucks 27, but any number of each may be used depending on the number of different items to be selected, the length of the conveyor, floor space available and other factors.

Usually the trucks 27 will be mounted on wheels so that they can be moved into and out of position very quickly and they will contain the items which are most frequently called for on the order blanks. However, this is not essential, and adjustable bins may be used on both the sides of the conveyor if it is found desirable to do so.

It will thus be seen that we have invented a package selector and loader that has many advantages over apparatus and methods heretofore used.

Our invention speeds up the loading of trucks and filling of orders, makes it much easier for the operator to make up orders, increases the accuracy of filling orders, saves floor space and decreases the cost of handling.

Having thus described what we now believe to be a preferred embodiment of our invention, we claim all equivalents and modifications thereof that may come within the scope or terms of the following claims.

We claim:

1. In a package selecting and loading means, the combination of a travelling conveyor having a runway along one side thereof, a plurality of package bins each adapted to hold a plurality of packages adjacent said conveyor on the side opposite said runway, the packages next adjacent to the conveyor being within reach of an operator on said runway, whereby the operator may select packages from said bins and place them on the conveyor, means on each bin operable by an operator on said runway to move remote packages on said bin toward said conveyor to bring them within his reach, and a trolley adjacent the runway side of the conveyor adapted to hold an order sheet for packages on the bins and movable by the operator along said conveyor as he moves along said runway and selects packages from said bins as called for by said order.

2. In a package selecting and loading means, the combination of a travelling conveyor having a runway along one side thereof, a plurality of package bins each adapted to hold a plurality of packages adjacent said conveyor on the side opposite said runway, the packages next adjacent to the conveyor being within reach of an operator on said runway, whereby the operator may select packages from said bins and place them on the conveyor, means on each bin operable by an operator on said runway to move remote packages on said bin toward said conveyor to bring them within his reach, a trolley adjacent the runway side of the conveyor adapted to hold an order sheet for packages in the bins and movable by the operator along said conveyor as he moves along said runway and selects packages from said bins as called for by said order, and means for counting the packages placed on the conveyor by the operator as they leave the conveyor.

3. In a package selecting and loading means, the combination of a main travelling conveyor having a horizontal upper run adapted to receive packages, a second travelling conveyor adapted to receive packages from said main conveyor, said second conveyor being inclined upwardly away from said main conveyor and moving at a higher speed whereby packages delivered from the main to the second conveyor will be spaced apart on said second conveyor, a runway for an operator along one side of said main conveyor, a plurality of adjustable package bins adjacent the opposite side of said main conveyor, each adapted to hold a number of packages within reach of an operator on said runway to place selected packages on said main conveyor, means within reach of the operator on said runway for adjusting each bin to bring remote packages within his reach, means for counting the packages on the second conveyor, and a trolley adapted to carry an order book and movable by the operator along said main conveyor as he selects packages from said package bins.

4. In a package selecting and loading means, the combination of a travelling conveyor having a runway along one side thereof, package trucks adjacent said runway within reach of an operator on the runway, adjustable package bins adjacent said conveyor on the side opposite said runway, said bins being adapted to hold packages within reach of the operator on the runway, whereby the operator may select packages from the trucks and bins and place them on the conveyor as he moves along the runway, means within reach of the operator for adjusting each bin to bring remote packages thereon within his reach from the runway, and a trolley for carrying an order book movable along said conveyor as the operator selects packages from said trucks and bins.

5. In a package selecting and loading means, the combination of a travelling conveyor having a runway along one side therof, package trucks adjacent said runway within reach of an operator on the runway, adjustable package bins adjacent said conveyor on the side opposite said runway, said bins being adapted to hold packages within reach of the operator on the runway, whereby the operator may select packages from the trucks and bins and place them on the conveyor as he moves along the runway, means within the reach of the operator on the runway for adjusting each bin to bring remote packages thereon within his reach, a trolley for carrying an order sheet movable along said conveyor as the operator selects packages from said trucks and bins, a second conveyor moving at a higher speed than said first conveyor and adapted to receive the packages therefrom, and a counter for counting the packages on the second conveyor.

6. In a package selecting and loading system including a travelling conveyor with a runway along one side thereof, a bin arranged adjacent said conveyor on the side thereof opposite said runway to present stacks of packages within the reach of an operator standing in the runway, the floor of said bin being formed by a fixed section and a movable section, and means associated with the bin for moving said movable section at will relatively to said fixed section to present successive stacks of packages in position within the reach of the operator.

7. A package selecting and loading system according to claim 6, wherein the fixed floor section is located immediately adjacent the conveyor and the movable floor section is arranged immediately in back of the fixed section and adapted by its movement to deposit the stacks of packages thereon.

8. In a package selecting and loading system including a travelling conveyor with a runway along one side thereof, a bin arranged adjacent said conveyor on the side thereof opposite said runway to present stacks of packages within the reach of an operator standing in the runway, the floor of said bin being formed by front and rear fixed sections and a movable intermediate section, and means associated with the bin for moving said movable section at will to receive successive stacks of packages from the rear fixed section and transfer them onto the front fixed section in position within the reach of the operator.

9. A package selecting and loading system according to claim 8, wherein the movable floor section comprises an endless belt extending over a pair of spaced-apart rollers, and the means for moving the section at will comprises a hand-wheel arranged within reach of the operator and having a chain and sprocket connection with one of said rollers for rotating it in either direction.

EUGENE S. TASCHER.
GUY BRUNGARD.

REFERENCES CITED

The following references are of record in the file of this patent:

UNITED STATES PATENTS

| Number | Name | Date |
| --- | --- | --- |
| 348,667 | Grillwitzer | Sept. 7, 1886 |
| 799,068 | Martin | Sept. 12, 1905 |
| 1,408,679 | Ball | Mar. 7, 1922 |
| 1,613,552 | Armstrong | Jan. 4, 1924 |
| 2,071,770 | Shield | Feb. 23, 1937 |
| 2,355,708 | Delucchi | Aug. 15, 1944 |
| 2,416,870 | Farmer | Mar. 4, 1947 |